Oct. 17, 1961     F. J. WINCHELL     3,004,452
SPLIT TORQUE TRANSMISSION
Filed May 1, 1958     6 Sheets-Sheet 3

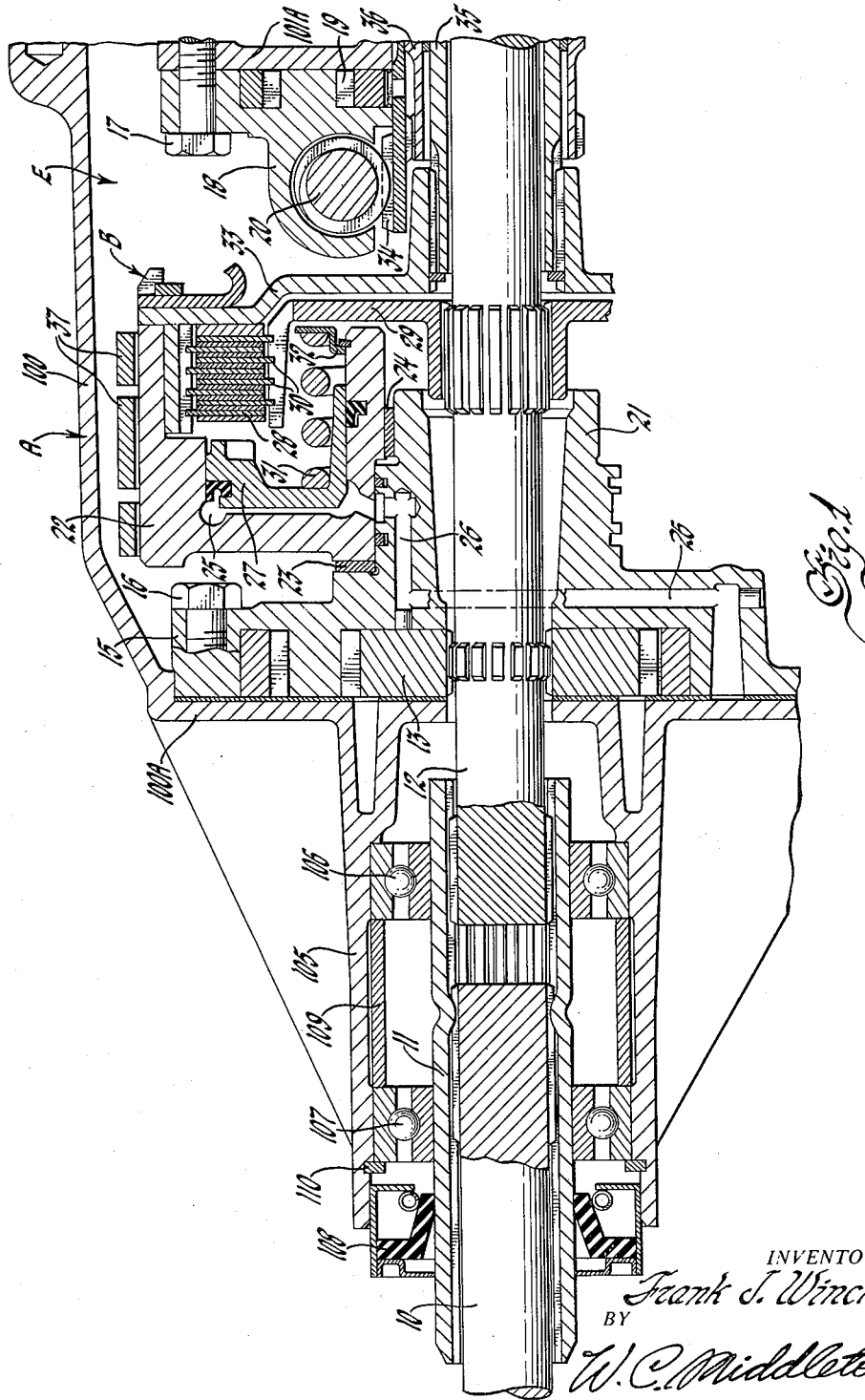

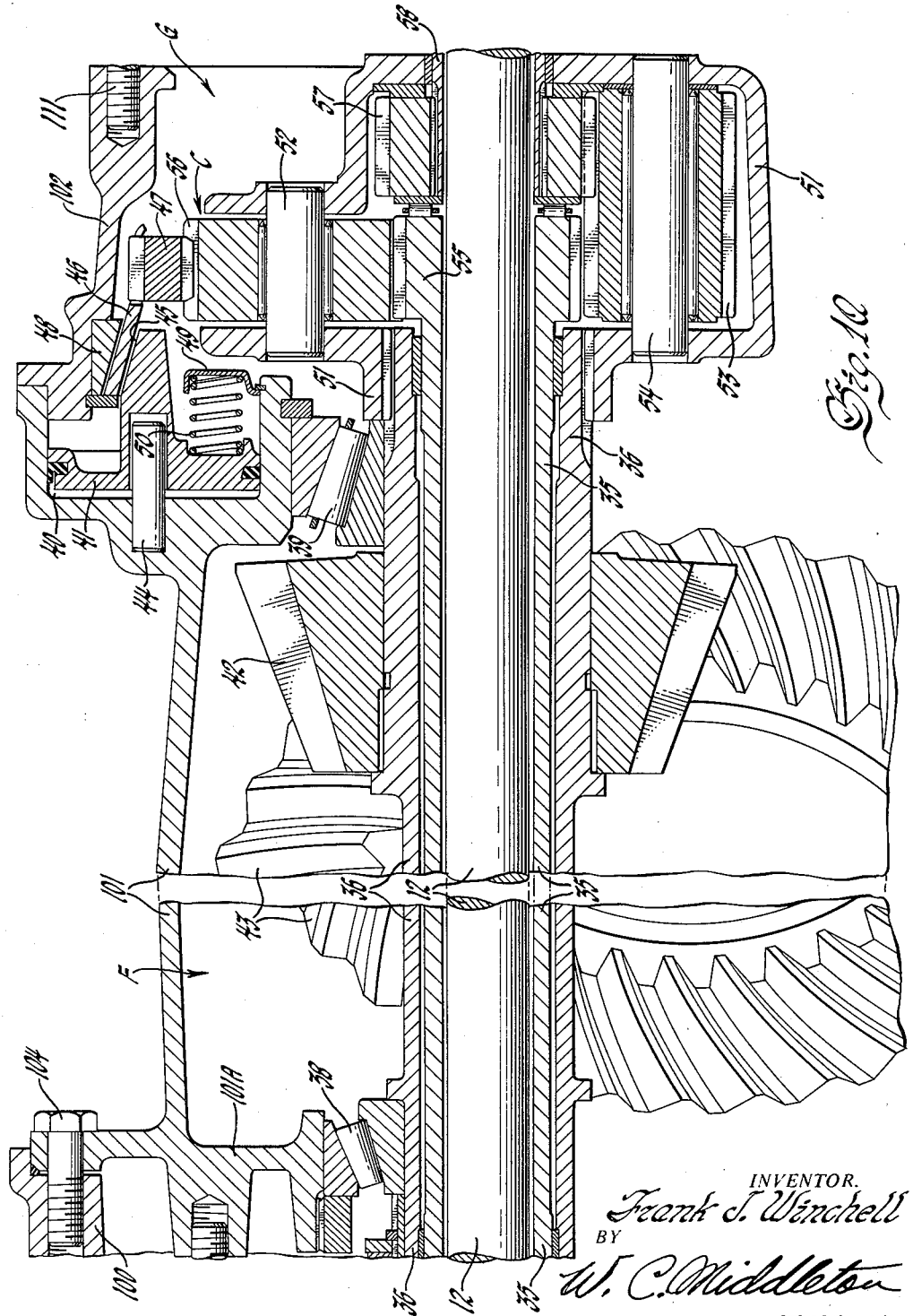

INVENTOR.
Frank J. Winchell
BY
W. C. Middleton
ATTORNEY

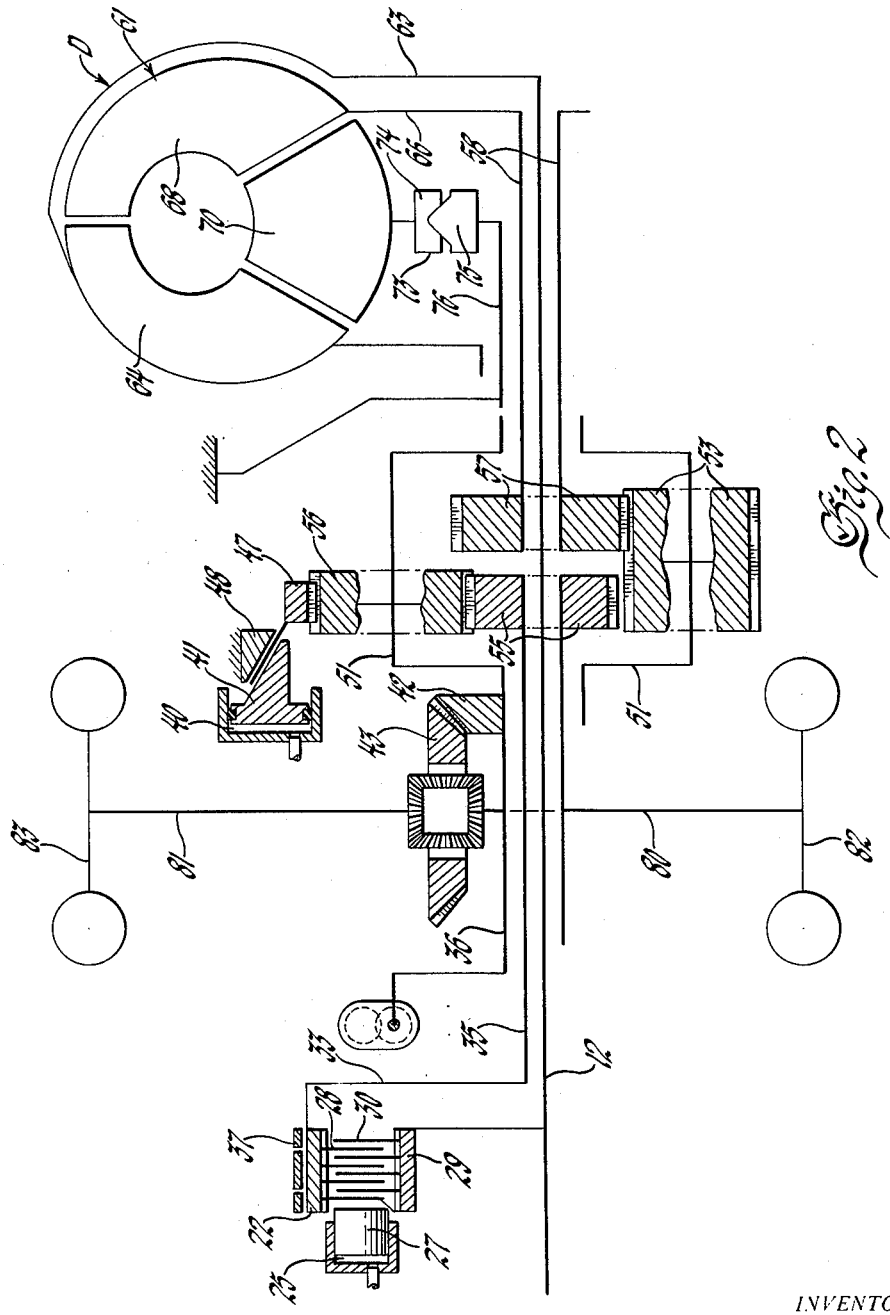

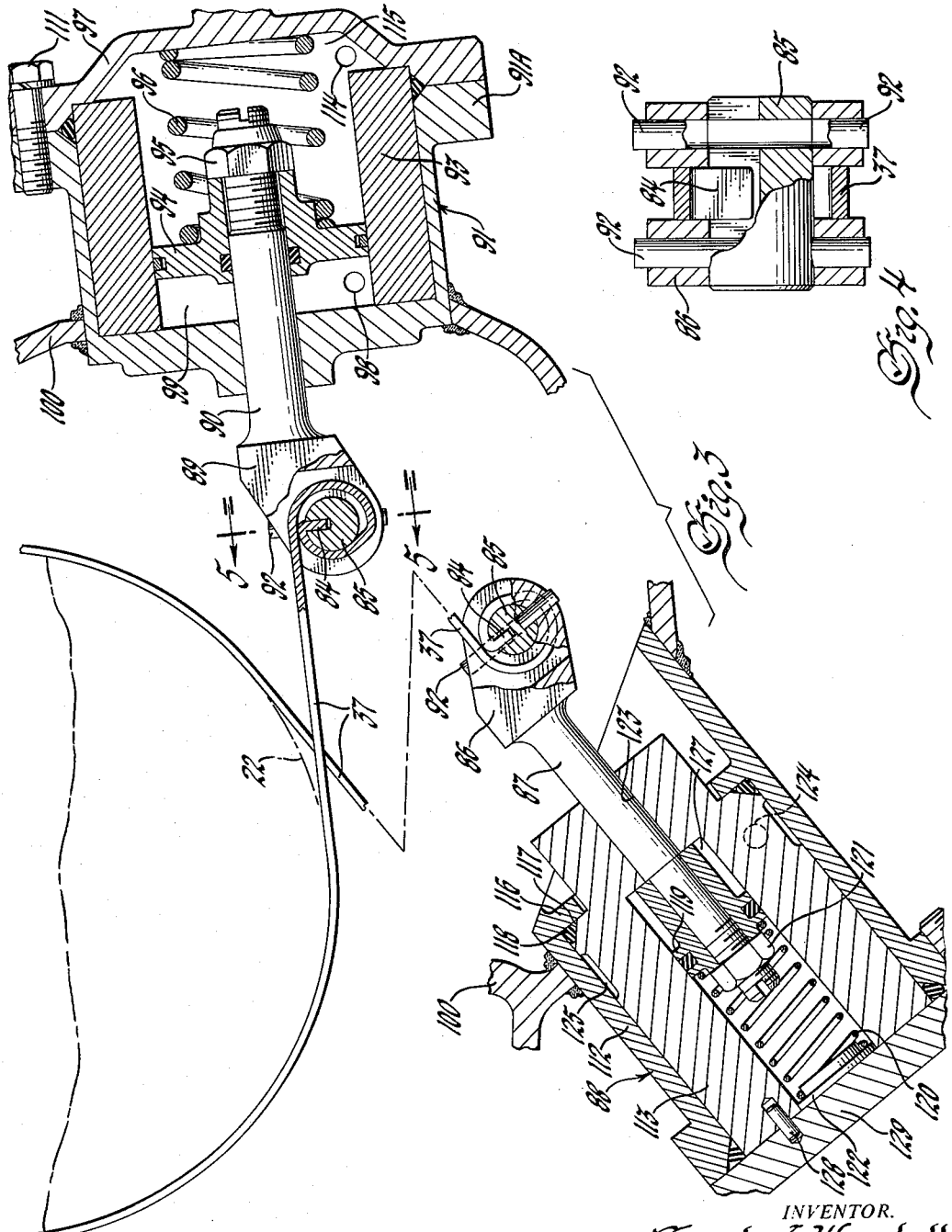

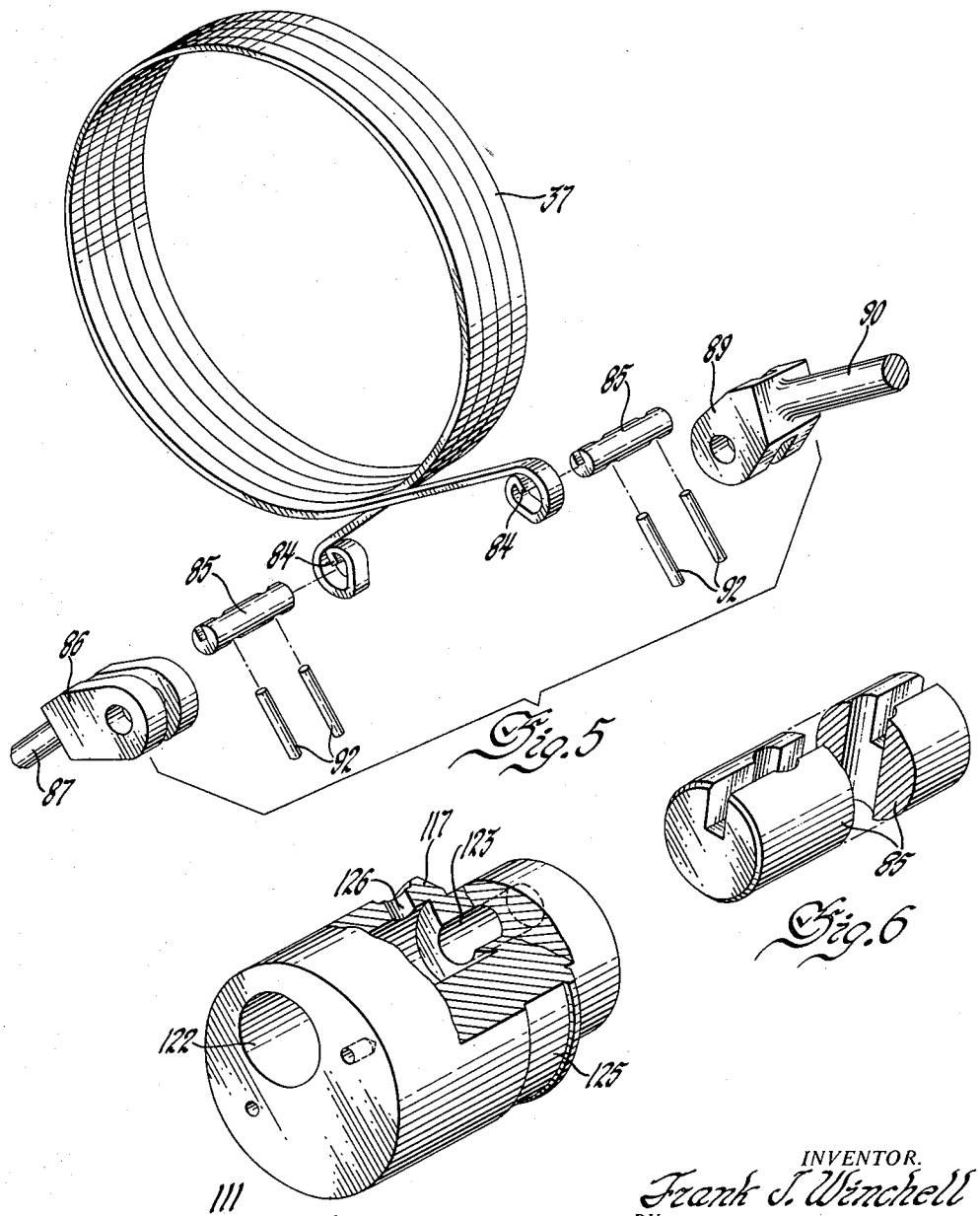

United States Patent Office 3,004,452
Patented Oct. 17, 1961

3,004,452
SPLIT TORQUE TRANSMISSION
Frank J. Winchell, Bloomfield Hills, Mich., assignor to General Motors Corporation, Detroit, Mich., a corporation of Delaware
Filed May 1, 1958, Ser. No. 732,288
11 Claims. (Cl. 74—688)

This invention relates to transmissions for use in vehicles and more particularly to transmissions of the type incorporating a planetary gearing unit and a hydrodynamic torque converter unit. The gearing and torque converter units are particularly adapted and arranged for mounting above a vehicle axle with the power delivery member of the transmission positioned directly above or adjacent to the vehicle drive axle. The transmission is designed for minimum vertical space requirement when assembled into a vehicle so that the conventional vehicle floor board "hump" used to accommodate the transmission may be minimized or eliminated. In one condition of operation, the transmission gear unit is driven solely through the torque converter for maximum torque multiplication. In a second condition of operation, the gear unit is driven both through the torque converter and by a direct mechanical drive connection for greater efficiency. This latter type of drive including the partial hydraulic drive of the gearing by the torque converter and partial direct mechanical drive of the gear unit directly by the engine is termed a split torque drive. The transmission contemplates the use of three concentric shafts extending over a vehicle axle shaft with the gear unit and converter positioned at one side of the axle and a clutch unit positioned at the opposite side of the axle from the converter and gear unit. In this manner the transmission may be mounted in the vehicle transverse to the axle shaft with a minimum vertical space requirement at a point above the axle.

An object of this invention is to provide a transmission assembly particularly adapted to be mounted longitudinally in a vehicle with the power delivery member of the transmission disposed over the vehicle drive axle and to minimize the vertical space required by the transmission above the vehicle drive axle.

Another object of this invention is to provide a transmission assembly wherein the housing is composed of an assembly of detachable housing sections for providing ready access to the different transmission units to facilitate easy servicing of any of the individual units without disturbing any unit not requiring service.

An additional object of this invention is to provide a transmission assembly including a hydrodynamic torque converter unit and a planetary gearing unit disposed closely adjacent to each other and having a drive ratio control unit spaced from the gear unit such that the power delivery mechanism driven by the gear unit extends into and terminates in the space between the gear unit and the drive ratio control mechanism.

A further object of this invention is to provide a transmission assembly, a hydrodynamic torque converter unit at one end of the assembly, a planetary gear unit adjacent the torque converter unit, a drive ratio control unit spaced from the gear unit wherein the power delivery mechanism driven by the gear unit extends into and terminates in the space between the gear unit and drive ratio control mechanism, and wherein an engine driven power input shaft extends through the entire assembly including the drive ratio control unit, the gear unit power delivery mechanism, and the gear unit to the converter for driving the converter impeller.

Another object of this invention is to provide a transmission having a hydrodynamic torque converter and planetary gearing unit arranged closely adjacent to each other with a drive ratio control unit spaced from the gear unit including an engine driven power input shaft extending through the drive ratio control unit and gear unit to the converter impeller, including a turbine driven shaft for driving a gear of the gear unit and a gear unit driven power delivery shaft extending into the space between the gear unit and drive ratio control unit and wherein the engine driven power input shaft, the drive ratio control shaft and power delivery shaft are in concentric arrangement with respect to each other so as to require a minimum vertical space in assembled relationship.

An additional object of this invention is to provide a brake band and servo mechanism wherein the brake band includes a flat metal strip and the servo mechanism includes a pair of fluid pressure responsive servo units adapted to apply the band to a drum by a two stage action.

These and other objects and advantages of this invention will be apparent from the following description and claims taken in conjunction with the accompanying drawings, in which:

FIGURE 1 is a longitudinal view of the power input and drive ratio control section of a transmission constructed in accordance with the principles of the invention.

FIGURE 1A is a longitudinal view of the intermediate portion of the transmission including the planetary gearing unit and power output mechanism.

FIGURE 2 is a schematic diagram of the transmission illustrating its mounting with respect to a vehicle axle.

FIGURE 3 is a sectional view of the break band servos illustrating the relationship of the brake drum, brake band and servos for applying the band to the drum.

FIGURE 4 is a partially sectional view of the assembly whereby the end of the band is secured to a servo.

FIGURE 5 is an exploded view illustrating the band and the means whereby the band is attached to the band actuating source.

FIGURE 6 is an enlarged perspective view of a pin for securing one end of the band to a servo.

FIGURE 7 is an enlarged partially sectional view of one of the band servo pistons.

Figure 1B:
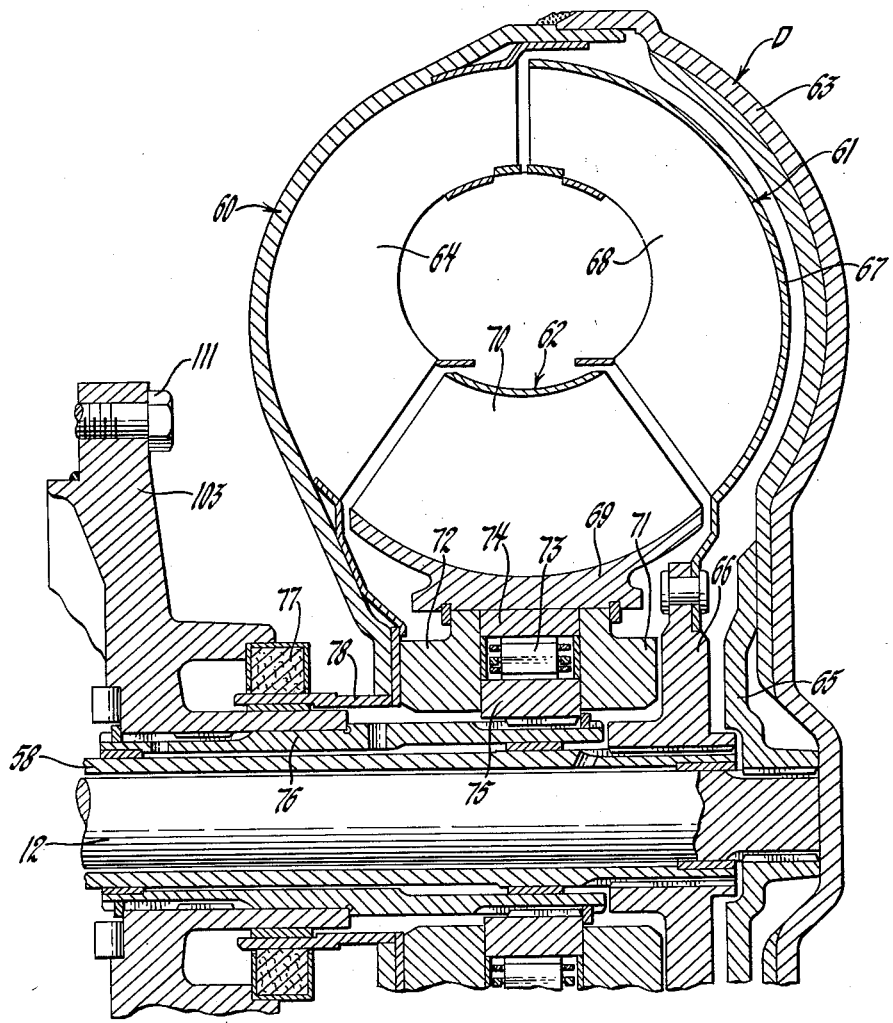
FIGURE 1B is a longitudinal view of the torque converter driven by the engine and adapted to drive the planetary gearing unit.

Referring to FIGURES 1, 1A and 1B there is shown a transmission housing indicated generally at A and composed of detachable housing sections 100, 101, 102 and 103. Housing section 100 encloses a drive ratio control unit indicated generally at B; housing section 101 contains a power delivery gear; section 102 encloses the planetary gear unit indicated generally at C. A hydrodynamic torque converter unit indicated generally at D is supported upon housing section 103.

Housing section 100 at the front of the transmission assembly is detachably secured to housing section 101 by means of suitable bolts 104. A boss 105 on housing section 100 extends outwardly to receive a pair of spaced bearings 106 and 107 and an oil seal 108. A splined adapter sleeve 11 supported in bearings 106 and 107 drivingly connects an engine driven drive shaft 10 to a transmission power input shaft 12. Shafts 10 and 12 are splined so that the transmission assembly may be quickly detached from shaft 10 simply by pulling the transmission assembly away from the shaft. Bearings 106 and 107 are retained in their normal positions in boss 105 by means of a bearing spacer sleeve 109. A snap ring 110 may be removed to replace the bearings. Housing section 100 encloses a chamber E, the ends of the chamber being closed off by an end wall 100A of housing section 100 and an end wall 101A of housing section 101. A pump housing 15 is bolted to wall 100A by means of bolts 16, the pump having a drive gear 13 driven by shaft 12. Disposed in chamber E and bolted to end wall 101A by bolts 17 is a pump housing 18, the housing 18 enclosing a pump drive gear 19 and a governor drive gear 20. Pump housing 15 is shaped to provide an axially extending boss 21 upon which is supported a drum 22, there being a thrust washer 23 and a bearing 24 between housing 15 and boss 21 and drum 22, respectively. Drum 22 is shaped to form a cylinder chamber 25 adapted to receive fluid under pressure through a passage 26 and having a piston 27 disposed therein. Drive ratio control unit B includes multiple clutch plates 28 splined to drum 22 so as to be axially movable with respect to the drum and to be nonrotatable with respect to the drum. A clutch hub 29 splined to shaft 12 carries clutch plates 30 splined thereto so as to be axially movable but nonrotatable with respect to hub 29. Piston 28 is effective to engage clutch plates 28—30 to lock clutch drum 22 to shaft 12 upon admission of fluid pressure to chamber 25. Suitable valving, not shown, may control the admission of fluid under pressure to and exhaust of pressure from chamber 25 and passage 26. A clutch release spring 31 seated upon a spring seat 32 carried by boss 21 assures release of the clutch upon exhaust of fluid pressure from chamber 25. A connector plate 33 splined to a hollow sleeve shaft 35 connects drum 22 to shaft 35 in a nonrotatable relationship so that drum 22 and shaft 35 rotate as a unit. A driver sleeve 34 splined to a gear unit power delivery shaft 36 drives governor drive gear 20 and pump gear 19 whenever shaft 36 is rotated. Rotation of drum 22 may be prevented by applying a band 37 to the drum under control of servos as hereafter more fully explained.

Referring to FIGURE 1A, housing section 101 is shown enclosing a chamber F through which extend shafts 12, 35 and 36, the shafts being concentric and thereby minimizing the vertical space needed to contain the shafts. Housing section 101 is shaped to form a cylinder chamber 40 adapted to receive a piston 41. Shafts 36, 25 and 12 are supported at opposite ends of chamber F by means of bearings 38 and 39. A transmission power delivery gear 42 is splined or keyed to shaft 36 for rotation with shaft 36. Gear 42 meshes with a ring gear 43 of a differential gear unit for driving the vehicle axle. It will be noted that the assembly at this point is very compact in its space requirement so that gear 42 may be disposed above the vehicle drive axle without requiring a large floor board hump. Brake actuator piston 41 is pinned to the portion of housing section 101 forming cylinder chamber 40 by means of a pin 44. A conical surface 45 on piston 41 is adapted to grip a conical extension 46 on a ring gear 47. A conical backing member 48 is fixed to housing section 102. The wall forming cylinder chamber 40 carries a spring retainer 49, there being a brake release spring 50 disposed between spring seat 49 and piston 41. To engage the brake, fluid under pressure may be admitted to chamber 40 by means of suitable passages and valving, not shown.

Housing section 102 encloses a chamber G containing gear unit C having a planet carrier 51 splined to sleeve shaft 36 and supporting a set of relatively long planet gears 53 and a set of relatively short planet gears 56 in mesh with each other. Short planet pinions 56 also mesh with ring gear 47 and a sun gear 55 fixed to hollow shaft 35. Planet gears 53 are driven by a sun gear 57 fixed to a sleeve shaft 58. Planet gears 53 and 56 are supported in planet carrier 51 by means of stub shafts 54 and 52, respectively.

Referring to FIGURE 1B, there is shown an end plate 103 for closing off the end of chamber G of FIGURE 1A, the cover 103 being bolted to housing section 102 by bolts 111. Cover 103 supports a hydrodynamic torque converter unit D having an impeller 60, a turbine 61 and a reaction member 62. Impeller 60 is provided with blades 64 carried by a shroud 63 driven by a hub 65 splined to engine driven power input shaft 12. A hub 66 splined to hollow sleeve shaft 58 supports a turbine shroud 67 carrying turbine blades 68. Reaction member 62 includes a hub 69 having reaction blades 70 affixed thereto, the hub 69 being supported upon a pair of spaced support rings 71 and 72. A one-way brake mechanism 73 is disposed between an outer race 74 fixed to hub 69 and an inner race 75 splined upon a ground sleeve 76. Ground sleeve 76 is splined to housing cover 103 so as to be nonrotatable. The one-way brake mechanism is arranged to prevent reverse rotation of reaction blades 70, but to permit forward rotation of blades 70 in the direction of rotation of impeller blades 68. An oil seal 77 carried by cover 103 prevents leakage of oil past an annular flange 78 on impeller 60.

The transmission assembly is constructed and arranged for simple, quick and easy assembly and disassembly. The arrangement is such that any of the units may be available for ready access without disturbing units which do not need servicing.

In FIGURE 2, there is shown a schematic diagram of the arrangement of the transmission as it is intended to be mounted in a vehicle. For the sake of simplicity similar parts of FIG. 2 bear the same reference numerals appearing in FIGS. 1, 1A and 1B. As shown, the transmission is disposed in a position at right angle to the vehicle drive axles 80 and 81 used to drive the vehicle wheels 82 and 83. The transmission extends across the axles 80 and 81 with the transmission drive ratio control mechanism positioned at one side of the axles and the gear unit and converter unit positioned at the opposite side of the axles. With this arrangement, the vertical space requirements of the transmission is minimum in the zone of its drive connection to the axle at the differential unit and forwardly of the axle. The arrangement makes possible the minimizing or elimination of the conventional tunnel normally required in the vehicle floor board to accommodate the transmission. The axles 80—81 are preferably the rear axles of the vehicle. With this arrangement both the front and rear tunnels in the front and rear passenger compartments may be eliminated, making possible the use of flat floor boards in both passenger compartments.

Details of the brake band and servo arrangement utilized to prevent rotation of drum 22 of FIG. 1 are shown in FIGURES 3 through 7. Brake band 37 shown in FIGURES 3 and 6 is composed of a flat strip of metal wound around drum 22 of FIG. 1 a plurality of turns, for example, five wraps. Each end of band 37 is wound around itself to terminate in an upstanding tongue 84. Each tongue 84 is assembled into a slotted pin 85. One of the pins 85 is assembled into a clevis 86 on a piston rod 87 of a so-called overrun servo 88, while the other of the pins 85 is assembled into a clevis 89 on a piston rod 90 of a so-called apply servo 91. Each of the pins 85 and the clevises 86 and 89 are drilled to receive retaining pins 92. Thus, the pins 85 are retained in the clevises 86 and 89 in a nonrotatable relationship. It will be noted that the head of clevis 86 is offset from piston rod 87 and the head of clevis 89 is offset from piston rod 90. In the assembly, the arrangement is such that tension forces applied to the ends of the band are in direct alignment with the center lines of the piston rods 87 and 89. Otherwise stated, the pins 85 in the assembly are offset from the longitudinal axis of the rods 87 and 89 such that the tension forces applied to band 37 lie in the longitudinal axis of piston rods 87 and 90 and are tangential to drum 22.

As shown in FIGURE 3, the band apply servo 91 includes a cylindrical housing 91A welded to transmission housing section 100 and having a cylindrical sleeve 93 disposed therein. The position of a piston 94 on a piston rod 90 may be adjusted by means of an adjusting nut 95. A band release spring 96 seated upon a servo cover 97 yieldably biases piston 94 toward a band release position. A servo chamber 99 is adapted to receive fluid under pressure through a port 98 in housing 91A. Admission of pressure to chamber 99 may be under control of a drive range selector valve (not shown) adapted to deliver pressure to chamber 99 whenever the valve is positioned for drive range operation. The admission of fluid pressure to and exhaust of pressure from chamber 99 is preferably under control of a combination of a drive range selector valve and a shift valve, not shown. With the drive range selector valve positioned for neutral, chamber 99 will be connected to exhaust and band 37 will be released from drum 22. A second servo chamber 115 at the opposite side of piston 94 from servo chamber 99 may receive fluid under pressure through a port 114. Control of pressure to chamber 115 may be under control of a shift valve, not shown. Assuming the drive range selector valve, not shown, to be positioned for drive range of operation and the shift valve, not shown, to be positioned in its low or reduction drive position, fluid pressure will be admitted to chamber 99 by the drive range selector valve and exhausted from chamber 115 by the shift valve to apply band 37 to drum 22. In the event the shift valve, not shown, is moved to its high or direct drive position, fluid pressure will be admitted to servo chamber 115. With fluid pressure in both chambers 99 and 115, spring 96 will be effective to release band 37 from drum 22. Housing cover 97 may readily be removed for adjusting the servo adjusting nut 95 by removing cover bolts 111.

Overrun servo 88 includes a cylindrical housing 112 welded to housing section 100 and a sleeve 113 extending through a retaining boss 116 on housing 112. Sleeve 113 is chamfered at 117 to receive an O-ring oil seal 118 disposed between the sleeve and the boss 116. Sleeve 113 is drilled to slidably receive piston rod 87 and drilled to receive a piston 119 and a spring 120. An adjusting nut 121 is provided to enable adjustment of piston 119 on rod 87. The drilled openings for receiving piston 119 and piston rod 87, designated 122 and 123 in FIGURE 7, are offset from the centerline axis of sleeve 113. Sleeve 113 may be rotated in housing 112 to position clevis 86 in alignment with the end of band 37 to which it is to be secured. A groove 125 in sleeve 113 overlies a port 124 in housing 112, there being a drilled passage 126 (see FIG. 7) in sleeve 113 between groove 125 and a servo chamber 127. Passage 124 in housing 112 is connected to a drive range selector valve, not shown, such that fluid pressure will be admitted to servo chamber 127 whenever the drive range selector valve is positioned for drive range operation. When the drive range selector valve is positioned for neutral, servo chamber 127 will be connected to exhaust. Sleeve 113 and servo cover 129 are drilled to receive a pin 128 adapted to prevent rotation of sleeve 113 with respect to housing 112 when the servo unit is assembled. Spring 120, seated upon cover 129, yieldably biases piston 119 toward a band release position. Cover 129 is bolted to housing 112 by bolts, not shown, for easy removal to facilitate adjustment of nut 121.

The arrangement of the two servos and the flat strip band 37 is designed to provide a brake of high capacity and yet capable of smooth application without harsh torque reaction bumps or grabbing. The arrangement provides high capacity both under engine drive torque and when the vehicle overruns the engine as may occur in descending a grade with the engine throttle closed. Application of band 37 to drum 22 occurs in two stages. In one stage there is slippage of the band on the drum. In the second stage, the band grips the drum firmly and with a high capacity due to the self-wrapping action of the band on the drum.

In describing the two stage action of application of band 37 to drum 22 it is important to note that servo piston 94 is of greater diameter than servo piston 119. When the manual drive range selector valve, not shown, is positioned for neutral, servo chambers 99, 115 and 127 are all connected to exhaust and springs 96 and 120 move pistons 94 and 119 to their band release position. Assuming that the vehicle is standing still with the engine running and that the drive range selector valve, not shown, is moved to its drive range position fluid pressure will be admitted to servo chambers 99 and 127. A transmission shift valve, not shown, will connect band release servo chamber 115 and clutch apply servo chamber 25 to exhaust. In the initial stage of application of band 37 to drum 22, small piston 119 will move against spring 120, compressing the spring, while piston 94 will initially act only as a fixed anchor without moving against spring 96. The servo chambers 127 and 99 are hydraulically connected in parallel, so that small piston 119 moves against its spring 120 before large piston 94 moves against its spring 96. The initial motion of piston 119 causes the initial application of band 37 to drum 22 with limited slippage of the band on the drum.

As the band is applied to the drum by piston 119, the self-wrapping effect of the band on the drum becomes effective to cause the band to grip the drum firmly without slippage. Due to tension forces set up in band 37 arising out of the self-wrap gripping action of the band on drum 22, the piston 119 is next pulled against fluid pressure in chamber 127 until piston 119 seats upon sleeve 113, whereupon the piston 119 acts as a fixed anchor. At the same time that piston 119 is moving toward its fixed anchor position, large piston 94, under action of fluid pressure in chamber 99, is moving to compress spring 96. This two stage action wherein the piston 94 initially acts as a fixed anchor and wherein piston 119 initially applies the band to the drum and subsequently is moved to a position wherein it becomes the fixed anchor results in smooth band application without grabbing in spite of the high gripping capacity of band 37 on drum 22 arising out of the self-wrap action of the band on the drum.

In the event that the engine throttle is relaxed so that the evhicle overruns the engine as in descending a grade, there is a reversal of torque applied to drum 22. Large piston 94 will thereupon be pulled, by tension forces arising in band 37, against the action of fluid pressure in chamber 99 until it seats on servo 91 and becomes a fixed anchor. Small piston 119 will be, at the same time, moved against spring 120 by action of fluid pressure in chamber 127. In this manner, the self-wrap gripping action of band 37 on drum 22 is maintained, both when the engine is driving the vehicle and when the vehicle is overrunning the engine.

Upon acceleration of the vehicle, a transmission shift valve, not shown, is moved to direct fluid pressure to clutch servo chamber 25 to apply clutch plates 28—30 and to band servo chamber 115 to release band 37 from drum 22. With fluid pressure directed to both servo chambers 115 and 99, spring 96 is effective to move piston 94 to release the band from the drum. Servo chamber 127 is also connected to exhaust by the shift valve, not shown, so that spring 120 moves piston 119 to its band release position. Band 37 is thereby released from drum 22 when clutch plates 28—30 are applied.

*Transmission operation*

For neutral, clutch plates 28—30 are released, brake band 37 is released, and reverse brake 46—45 is released so that no reaction point is effective in the transmission. Shaft 12 rotates impeller 60 causing rotation of turbine 61, sleeve shaft 58 and sun gear 57. Due to the load of the vehicle upon planet carrier 51, the carrier remains stationary with the planet gears 53 and 56 spinning on stub shafts 54 and 52, respectively. Sun gear 55, sleeve shaft 35 and drum 22 rotate freely. The engine may be sped up for rapid engine warm up without driving the vehicle.

For forward operation in low range, band 37 is applied to drum 22 as heretofore explained to prevent rotation of drum 22 and sun gear 55. Drive is then by way of shaft 12, impeller 60, turbine 61, and sleeve shaft 58 to sun gear 57. Sun gear 57 drives long planet gears 53 which drive short planet gears 56. Planet gears 56 travel around the fixed sun gear 55 to cause rotation of planet carrier 51, sleeve shaft 36 and power delivery gear 42. The drive of gear 42 is by way of torque multiplication of both the hydrodynamic torque converter and the planetary gearing unit. Upon attainment of sufficient vehicle speed, a shift valve, not shown, causes engagement of clutch 28—30 and release of band 37 as heretofore explained. Sun gear 55 is thereupon driven directly by the engine shaft 12 through a direct mechanical drive. With sun gear 57 driven by the turbine 61 and sun gear 55 driven directly by the engine, the planetary gearing is in direct drive. This combination of torque in the drive train wherein one element is driven directly by the engine and another element through the torque converter is termed a split torque drive.

For reverse operation, band 37 and clutch 28—30 are released, and ring gear 47 is braked against rotation. The manual drive range selector valve, not shown, is arranged to connect the brake band servos and clutch servo to exhaust and to direct fluid pressure to servo chamber 40 to establish reverse. Drive in reverse is through torque converter turbine 61, sleeve shaft 58, sun gear 57, planet gears 53 and 56, and planet carrier 51. With ring gear 47 serving as a reaction member, the planet carrier 51 rotates in a direction reverse to that of sleeve shaft 58 and sun gear 57.

It will readily be understood that there has been provided a transmission in which the band application is accomplished in two stages for smooth action and high capacity. The various units of the transmission may be quickly and easily serviced without disturbing portions not needing service. The arrangement of the drive ratio control unit spaced from the gear unit with the output gear disposed between the drive ratio control unit and gear unit and the concentric shafts 36, 35 and 12 makes possible a transmission adapted to be mounted over a vehicle axle with minimum vertical space requirement at a point above the axle. The split torque drive provides for maximum efficiency and economy of operation while maintaining the torque converter in the drive train in all gear ratios. The use of the flat metal strip brake band in conjunction with the two stage operation of the brake servos provides a brake of high capacity, long useful life and are capable of smooth application in spite of its high capacity.

I claim:

1. A transmission assembly including a hydrodynamic torque converter unit and a planetary gearing unit, said converter unit including impeller, turbine and reaction members, respectively, said gearing unit including a planet carrier supporting a set of relatively long planet gears in mesh with a set of relatively short planet gears, a first sun gear in mesh with said long planet gears, a second sun gear in mesh with said short planet gears, an engine driven shaft extending through said assembly for continuously driving said impeller, a turbine driven sleeve concentric with and external of said engine driven shaft for driving said first sun gear, a ground sleeve concentric with and external of said turbine driven sleeve and fixed against rotation, said ground sleeve rotatably supporting said turbine driven sleeve and said engine driven shaft therein, one-way brake means between said torque converter reaction member and said ground sleeve for preventing rotation of said reaction member in one direction, an additional sleeve fixed to said second sun gear concentric with and external of said engine driven shaft and coaxial with said turbine driven sleeve and adapted to be alternately braked against rotation and clutched to said engine driven shaft, a clutch and brake unit selectively operable to alternately brake said additional sleeve against rotation and to clutch said additional sleeve to said engine driven shaft, and a power delivery sleeve concentric with and external of said additional sleeve driven by said planet carrier, said power delivery sleeve providing a rotatable support for said additional sleeve and said engine driven shaft.

2. A transmission assembly including a hydrodynamic torque converter unit including impeller, turbine and reaction members, respectively, a planetary gearing unit and a clutch and brake unit, said gearing unit including a planet carrier supporting a set of relatively long planet gears in mesh with a set of relatively short planet gears, a first sun gear in mesh with said long planet gears, a second sun gear in mesh with said short planet gears, an engine driven shaft extending through said assembly for driving said impeller and connected to said impeller externally of the path of fluid flow through said converter, a turbine driven sleeve concentric with said engine driven shaft directly connecting said first sun gear to said turbine for driving said first sun gear, said engine driven shaft extending through said turbine driven sleeve, a ground sleeve concentric with said turbine driven sleeve and external of said turbine driven sleeve and fixed against rotation, said ground sleeve supporting said turbine driven sleeve and said engine driven shaft for rotation therein, one-way brake means between said torque converter reaction member and said ground sleeve for preventing rotation of said reaction member in one direction, an additional sleeve fixed to said second sun gear concentric with said engine driven shaft and coaxial with said turbine driven sleeve, said additional sleeve being external of said engine driven shaft, said clutch and brake unit being operable to alternately brake said additional sleeve against rotation and to clutch said additional sleeve to said engine driven shaft, and a power delivery sleeve concentric with and external of said additional sleeve driven by said planet carrier, said torque converter unit, said planetary gearing unit, said power delivery sleeve and said clutch and brake unit being positioned in said assembly in the order of their remoteness from said engine in the order named, said power delivery sleeve supporting said additional sleeve and said engine driven shaft for rotation therein.

3. A transmission assembly including a housing having first, second and third housing sections detachably secured to each other in assembled relationship, a hydrodynamic torque converter unit mounted upon said first housing section including impeller, turbine and reaction members, respectively, a planetary gearing unit positioned in said first housing section, a clutch and brake unit in said third housing section, said gearing unit including a planet carrier supporting a set of relatively long pinion gears in mesh with a set of relatively short pinion gears, a first sun gear in mesh with said long pinion gears and a second sun gear in mesh with said short pinion gears, a power delivery gear disposed in said second housing section, an engine driven power shaft extending through all three housing sections connected to said impeller by means of a connection external of the path of fluid flow through said converter for driving said impeller, a turbine driven sleeve concentric with and external of said engine driven shaft for driving said first sun gear, a ground sleeve concentric with and external of said turbine driven sleeve and fixed against rotation, said ground sleeve supporting said turbine driven sleeve and said engine driven shaft for rotation therein, a one-way brake mechanism between said ground sleeve and said reaction member for preventing reverse rotation of said reaction member, an additional sleeve fixed to said second sun gear concentric with and external of said engine driven shaft and coaxial with said turbine driven sleeve extending from said second housing section into said third housing section, said clutch and brake unit being alternately operative to brake said additional sleeve against rotation and to clutch said additional sleeve to said engine driven shaft, and a power delivery sleeve concentric with and external of said additional sleeve driven by said planet carrier and fixed to said power delivery gear, said power delivery sleeve supporting said additional sleeve and said engine driven shaft for rotation therein, said first, second and third housing sections being positioned in the order of their remoteness from the end of said engine driven shaft at which power is applied to said engine driven shaft in the order named.

4. A transmission assembly including a hydrodynamic torque converter unit and a planetary gearing unit, said converter unit including impeller, turbine and reaction members, respectively, said planetary gearing unit including a planet carrier supporting a set of relatively long planet gears in mesh with a set of relatively short planet gears, a first sun gear in mesh with said long planet gears, a second sun gear in mesh with said short planet gears, an engine driven shaft extending through said assembly for driving said impeller, means external of the path of fluid flow through said converter directly connecting said engine driven shaft to said impeller, a turbine driven sleeve concentric with and external of said engine driven shaft for driving said first sun gear, a ground sleeve concentric with and external of said turbine driven sleeve and fixed against rotation, said ground sleeve supporting said turbine driven sleeve and said engine driven shaft for rotation therein, a one-way brake between said ground sleeve and said converter reaction member for preventing reverse rotation of said reaction member, a rotatable drum, an additional sleeve concentric with said engine driven shaft and coaxial with and external of said turbine driven sleeve for connecting said second sun gear to said drum in a nonrotatable relationship with respect to said drum, fluid pressure responsive clutch means for clutching said drum to said engine driven shaft, fluid pressure responsive brake means for braking said drum against rotation, a power delivery sleeve driven by planet carrier concentric with and external of said additional sleeve, said power delivery sleeve supporting said additional sleeve and said engine driven shaft for rotation therein and a power output gear fixed to said power output sleeve and positioned in said assembly intermediate said drum and said planetary gearing unit.

5. A transmission assembly including a hydrodynamic torque converter unit and a planetary gearing unit, said converter unit including impeller, turbine and reaction members, respectively, said planetary gearing unit including a planet carrier supporting a set of relatively long planet gears in mesh with a set of relatively short planet gears, a first sun gear in mesh with said long planet gears, a second sun gear in mesh with said short planet gears, an engine driven shaft extending through said assembly for driving said impeller, a drive connection between said engine driven shaft and said impeller extending externally of the path of travel of working fluid in said converter connecting said impeller to said engine driven shaft for continuous rotation therewith, a turbine driven sleeve concentric with said engine driven shaft for driving said first sun gear, said engine driven shaft extending through said turbine driven sleeve, a ground sleeve concentric with said turbine driven sleeve and fixed against rotation, said turbine driven sleeve extending through said ground sleeve, said ground sleeve supporting said turbine driven sleeve and said engine driven shaft for rotation therein, one-way brake mechanism between said ground sleeve and said turbine reaction member for preventing reverse rotation of said reaction member, said torque converter unit being disposed at one end of said assembly, a rotatable drum disposed in said assembly adjacent the opposite end of said assembly from said torque converter unit, said planetary gearing unit being disposed in said assembly intermediate said torque converter unit and said drum, an additional sleeve concentric with said engine driven shaft and coaxial with said turbine driven sleeve for connecting said second sun gear to said drum for rotation therewith, said engine driven shaft extending through said additional sleeve, an engageable and releasable clutch for clutching said drum to said engine driven shaft, an engageable and releasable brake for braking said drum against roattion, a power delivery sleeve driven by said planet carrier concentric with said additional sleeve and positioned in said assembly intermediate said carrier and said drum, said additional sleeve extending through said power delivery sleeve, said power delivery sleeve supporting said additional sleeve and said engine driven shaft for rotation therein, and a power delivery gear fixed for rotation with said power delivery sleeve and positioned in said assembly intermediate said gearing unit and said drum.

6. A transmission assembly including a hydrodynamic torque converter unit and a planetary gearing unit, said converter unit including impeller, turbine and reaction members, respectively, said planetary gearing unit including a planet carrier supporting a set of relatively long planet gears in mesh with a set of relatively short planet gears, a first sun gear in mesh with said long planet gears, a second sun gear in mesh with said short planet gears, an engine driven shaft extending through said assembly for driving said impeller, a turbine driven sleeve concentric with said engine driven shaft for driving said first sun gear, said engine driven shaft extending through said turbine driven sleeve, means connecting said engine driven shaft to said impeller for rotation therewith including a shroud extending external of the path of travel of working fluid in said converter, a ground sleeve concentric with said turbine driven sleeve and fixed against rotation, one-way brake mechanism between said ground sleeve and converter reaction member for preventing reverse rotation of said reaction member, said turbine driven sleeve extending through said ground sleeve, said ground sleeve supporting said impeller for rotation and supporting said engine driven shaft and said turbine driven shaft for rotation therein, an additional sleeve fixed to second sun gear for rotation therewith and concentric with said impeller drive shaft, a drum member fixed to said additional sleeve for rotation therewith, engageable and releasable brake means for braking said drum against rotation including a flat metal band wrapped around said drum a plurality of turns, fluid pressure responsive means for applying said band to said drum including a first servo fixed to one end of said band and a second servo fixed to the opposite end of said band, engageable and releasable clutch means for clutching said drum to said engine driven shaft including a fluid pressure responsive servo, and a power delivery sleeve concentric with additional sleeve and coaxial with said turbine driven sleeve driven by said planet carrier, said power delivery sleeve being positioned in said assembly between said planetary gearing unit and said drum member, said additional sleeve extending through said power delivery sleeve, said engine driven shaft extending through said additional sleeve, said power delivery sleeve supporting said additional sleeve and said engine driven shaft for rotation therein.

7. A transmission assembly including a hydrodynamic torque converter unit and a planetary gearing unit, said converter unit being disposed in said assembly at one end of said assembly and including impeller, turbine and reaction members, respectively, said planetary gearing unit being disposed in said assembly adjacent said converter unit and including a planet carrier supporting a relatively long planet gear in mesh with a relatively short planet gear, a first sun gear in mesh with said long planet gear, a second sun gear in mesh with said short planet gear, a rotatable drum spaced from said planetary gearing unit, an engine driven shaft extending from one end of said assembly to the opposite end of said assembly and extending through said drum, said sun gears and said torque converter unit for driving said impeller, a turbine driven sleeve concentric with said engine driven shaft for driving said first sun gear, said engine driven shaft extending through said turbine driven sleeve, means connecting said impeller to one end of said engine driven shaft for rotation therewith including a shroud extending external to the path of fluid flow through said converter, one-way brake mechanism including an axially extending member fixed against rotation and supporting said reaction member thereon, said turbine driven sleeve extending through said fixed member, said fixed member supporting said turbine driven sleeve and said engine driven shaft for rotation therein, for preventing reverse rotation of said torque converter reaction member, a second sleeve concentric with said engine driven shaft and coaxial with said turbine driven sleeve for connecting said second sun gear to said drum for rotation as a unit, a power delivery sleeve driven by said planet carrier concentric with said second sleeve and disposed in said assembly between said planetary gearing unit and said drum, said engine driven shaft extending through said second sleeve, said second sleeve extending through said power delivery sleeve, said power delivery sleeve supporting said second sleeve and said engine driven shaft for rotation therein, a power delivery gear fixed to said power delivery sleeve intermediate said gear unit and drum, engageable and releasable brake mechanism for preventing rotation of said drum, and engageable and releasable clutch mechanism for clutching said drum directly to said engine driven shaft.

8. A transmission assembly including a hydrodynamic torque converter unit and a planetary gearing unit, said converter unit being disposed in said assembly at one end thereof and including impeller, turbine and reaction members, respectively, said planetary gearing unit being disposed in said assembly adjacent said converter unit and including a planet carrier supporting a relatively long planet gear in mesh with a relatively short planet gear, a first sun gear in mesh with said long planet gear and driven by said turbine, a quill shaft connecting said turbine to said first sun gear, a second sun gear in mesh with said short planet gear, a rotatable drum spaced from said planetary gearing unit, a first sleeve connecting said drum to said second sun gear in a nonrotatable relationship, a power delivery sleeve concentric with said first sleeve driven by said planet carrier and extending into the space between said drum and said planetary gearing unit, said power delivery sleeve supporting said first sleeve for rotation therein, a power delivery gear fixed to said power delivery sleeve in the space between said drum and said gear unit, an engine driven power shaft extending from one end of said assembly to the opposite end of said assembly for driving said impeller, said engine driven shaft extending through said drum, said first sleeve, both of said sun gears and said torque converter, said first sleeve supporting said engine driven shaft for rotation therein, means connecting one end of said engine driven shaft to said impeller including a shroud extending externally of the path of fluid flow through said converter, engageable and releasable brake means for preventing rotation of said drum, fluid pressure actuated mechanism for engaging and releasing said brake means to and from said drum, means for preventing reverse rotation of said converter reaction member including an axially extending ground member, said engine driven shaft extending through said quill shaft, said quill shaft extending through said ground member, said ground member supporting said reaction member for rotation in one direction and supporting said quill shaft and said engine driven shaft for rotation therein, and a fluid pressure actuated engageable and releasable clutch for clutching said drum to said engine driven shaft.

9. A transmission assembly comprising a housing formed of first, second and third detachable housing sections, respectively, a hydrodynamic torque converter unit supported upon said third housing section at one end of said assembly, said converter unit including impeller, turbine and reaction members, respectively, a planetary gearing unit disposed in said third housing section including a planet carrier supporting a set of relatively long planet gears in mesh with a set of relatively short planet gears, a turbine driven sun gear in mesh with said long planet gears, a quill shaft connecting said sun gear to said turbine for rotation therewith, a second sun gear in mesh with said short planet gears, a gear unit power delivery sleeve driven by said planet carrier extending across said second transmission housing section, a power delivery gear fixed to said sleeve, a bearing at each end of said second housing section for supporting said power delivery sleeve, one of said bearings being disposed intermediate said power delivery gear and said planet carrier, a gear unit ratio control mechanism disposed in said first housing section and including a sleeve extending across said second housing section and connected to said second sun gear, and an engine driven power input shaft extending through said first, second and third housing sections, respectively, said engine driven shaft extending through said gear unit ratio control unit, said ratio control sleeve and both of said sun gears for driving said impeller, means connecting said engine driven shaft to said impeller including a shroud member extending externally of the path of travel of fluid through said converter, means preventing rotation of said reaction member in one direction and for permitting rotation of said reaction member in the opposite direction including an axially extending ground member, said ground member providing a support for said reaction member, said engine driven shaft extending through said quill shaft, said quill shaft extending through said axially extending ground member, said ground member supporting said quill shaft and said engine driven shaft for rotation therein, said power delivery sleeve supporting said ratio control sleeve and said engine driven shaft for rotation therein.

10. A transmission assembly including a hydrodynamic torque converter unit, a planetary gearing unit, and a transmission drive ratio control unit, said converter unit being disposed in said assembly at one end of said transmission and including impeller, turbine and reaction members, respectively, said gearing unit being disposed in said assembly adjacent said converter unit and including a planet carrier supporting a set of relatively long planet gears in mesh with a set of relatively short planet gears, a turbine driven sun gear in mesh with said long planet gears, a turbine driven sleeve shaft upon which said turbine is supported for rotation fixed to said turbine and said sun gear for totation as a unit with said sun gear and said turbine, a second sun gear in mesh with said short planet gear, said drive ratio control unit including a rotatable drum spaced from said planetary gearing unit, means comprising a second sleeve shaft coaxial with said turbine driven sleeve shaft connecting said drum to said second sun gear for rotaiton as a unit with said second sun gear, a power delivery sleeve driven by said planet carrier and extending into and terminating in the space between said gear unit and said drum, an engine driven power shaft extending from the end of said assembly adjacent said drum through said drum and sun gears to the opposite end of said assembly for driving said impeller, said engine driven power shaft extending through said turbine driven sleeve shaft and being supported for rotation in said sleeve shafts, a drive connection between said engine driven power shaft and said impeller comprising a shroud extending externally of the path of fluid flow through said converter, an axially extending ground sleeve supporting said turbine driven sleeve shaft and said engine driven power shaft for rotation therein and supporting said reaction member externally thereof, said second sleeve shaft extending through said power delivery sleeve, said engine driven shaft extending through said second sleeve shaft, said second sleeve shaft and said engine driven shaft being supported for rotation in said power delivery sleeve, a brake band formed of a flat strip of metal wrapped around said drum a plurality of turns and adapted to be applied to and released from said drum, fluid pressure responsive means for applying said band to and releasing said band from said drum comprising a first servo including a piston fixed to one end of said band and a second servo including a piston fixed to the opposite end of said drum, one of said pistons being of greater diameter than the other of said pistons, an engageable and releasable clutch adapted to clutch said drum to said engine driven shaft, and a fluid pressure responsive piston for engaging said clutch.

11. A transmission assembly including a hydrodynamic torque converter unit disposed at one end of said assembly, a drive ratio control unit disposed adjacent the opposite end of said assembly from said conveter unit, and a planetary gearing unit disposed in said assembly adjacent said converter unit and between said converter unit and said drive ratio control unit, said converter unit including impeller, turbine and reaction members, respectively, said planetary gearing unit including a planet carrier supporting a set of relatively long planet pinions in mesh with a set of relatively short planet pinions, a sun gear driven by said converter turbine in mesh with said long planet gears and connected for rotation as a unit with said turbine by means of a turbine driven sleeve shaft, a second sun gear in mesh with said short planet gears, said drive ratio control unit including a rotatable drum secured to said second sun gear for rotation therewith as a unit by means of a second sleeve shaft coaxial with said turbine driven sleeve shaft, a power delivery member driven by said planet carrier and disposed in and terminating in the space between said gear unit and said drive ratio control unit, an engine driven power shaft extending from the end of said assembly adjacent said drive ratio control unit through said drum and both of said sun gears to the opposite end of said assembly for driving said impeller, said engine driven power shaft extending through both of said sleeve shafts, means connecting one end of said engine driven power shaft to said impeller including a shroud extending external of the path of fluid flow through said converter, an axially extending support member supporting said reaction member externally thereon and supporting said turbine driven sleeve and said engine driven power shaft therein, said second sleeve shaft extending through said power delivery member and said engine driven power shaft extending through said second sleeve shaft, said power delivery member supporting said second sleeve shaft and said engine driven power shaft for rotation therein, a brake band wrapped around said drum a plurality of turns and adapted to be applied to and released from said drum, a fluid pressure responsive servo including a housing having a sleeve therein, a bore in said sleeve offset from the central longitudinal axis of said sleeve, a piston in said bore secured to one end of said brake band, said sleeve being rotatable in said housing to position said piston into alignment with the end of said brake band to which said piston is secured, a second servo having a piston therein secured to the opposite end of said brake band, one of said pistons being of greater diameter than the other of said pistons, and an engageable and releasable clutch for clutching said engine driven power shaft to said drum, said clutch including a fluid pressure responsive piston for engaging said clutch.

References Cited in the file of this patent

UNITED STATES PATENTS

| | | |
|---|---|---|
| 2,146,569 | Fichtner | Feb. 7, 1939 |
| 2,364,448 | Jandasek | Dec. 5, 1944 |
| 2,523,783 | Schjolin | Sept. 26, 1950 |
| 2,703,155 | Simpson | Mar. 1, 1955 |
| 2,889,715 | De Lorean | June 9, 1959 |